April 8, 1924.
R. H. NEIL
LIGHT PROJECTOR
Filed Nov. 25, 1922
1,489,646
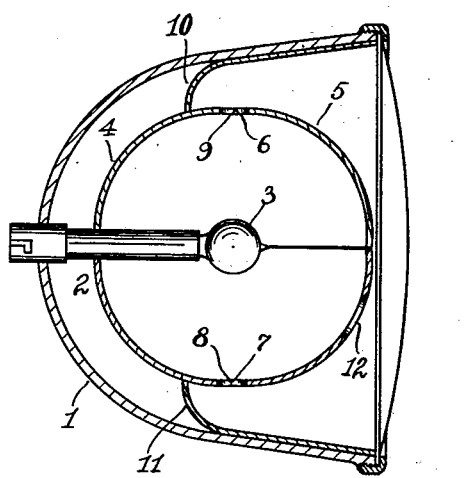
Fig.1
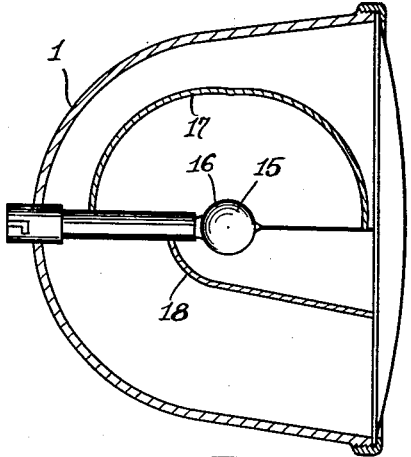
Fig.2
Fig.4
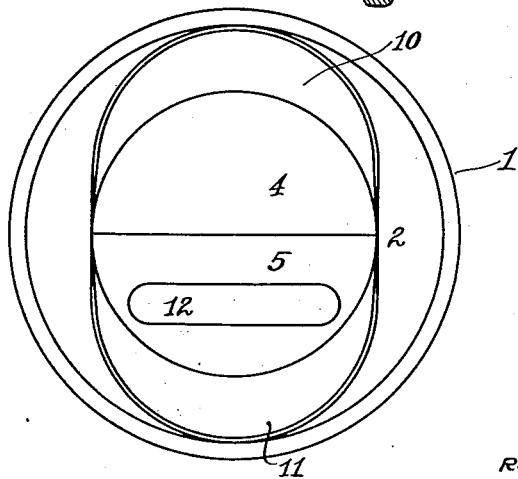
Fig.3
INVENTOR
RUSSELL H. NEIL
BY
Harry Schroeder
ATTORNEY Patented Apr. 8, 1924.

1,489,646

UNITED STATES PATENT OFFICE.

RUSSELL H. NEIL, OF BERKELEY, CALIFORNIA.

LIGHT PROJECTOR.

Application filed November 25, 1922. Serial No. 603,188.

*To all whom it may concern:*

Be it known that I, RUSSELL H. NEIL, a citizen of the United States, residing at Berkeley, in the county of Alameda and State of California, have invented certain new and useful Improvements in Light Projectors, of which the following is a specification.

My invention is an improved light projector.

A parabolic reflector will transmit parallel rays of light with no diffusion if the source is a point of light at its focus. The average light approximates the point source by placing the light bulb at the focus of the parabaloid, but it is far from accurate because of the size of the incandescent filament.

The object of my invention is to produce a point of light from a light bulb by means of a properly curved reflecting surface which will focus the rays at a point and reflecting the point source in a parabolic reflector in parallel rays.

In the drawing in which my invention is illustrated I have shown the preferred form, but it may be embodied in other forms, and in the specification and appended claims I wish to cover it in whatever form it may be embodied.

Referring to the drawing:

Figure 1 is a transverse sectional view of my reflector.

Figure 2 is a transverse sectional view of a modified form of my invention.

Figure 3 is a front view of my invention.

Figure 4 is an enlarged front view of the light screen.

Referring more particularly to the drawing, the numeral 1 indicates a housing in which my reflector 2 is positioned. The light 3 is positioned within and entirely enclosed by two ellipsoidal casings 4 and 5, the light being on the common focus of the two casings. The other focus of the casing 4 is at 6 which is on the periphery of the casing 5. The other focus of the casing 5 is at 7 on the periphery of the casing 4. Openings 8 and 9 are formed in the casings 4 and 5 respectively around the foci 7 and 6 respectively. These openings allow the focused rays of the casings 4 and 5 to pass outwardly, to be reflected from the parabolic reflectors 10 and 11 in parallel rays. The rays of light in passing through the foci 7 and 6 approximate in point very closely, which enables the parabolic reflectors to operate under ideal conditions; that is, there is no diffusion of light from them.

In actual practice I have found that the proper curvature for the casings 4 and 5 are ellipsoids of one-third eccentricity; that is, the distance between the foci equals one-third the major axis. To throw light on the road in front of the automobile, an opening 12 is provided in the front wall of the casing 5.

In the modified form of my invention shown in Figure 2, the light 15 is placed at one of the foci 16 of an ellipsoidal casing 17, the other focus of said casing being immediately adjacent the focus 16. A half parabolic reflector 18 is placed in the casing 1 in such a position that its focus is at 16 and consequently will reflect the light in parallel rays with little diffusion. The light which is not reflected by the reflector 18 is thrown on the road immediately in front of the car. This is desirable for an automobile headlight where it is necessary to see objects at either side of the road.

Due to imperfections in the forming of the reflecting casings and in the size of the incandescent wire, it is not possible to get all of the rays to pass through the foci of said casings. To obviate this difficulty, I insert a screen 20 in the openings 8 and 9 to diffuse all of the rays except those passing through the hole 21. Thus an almost perfect point of light is obtained. The glass around the hole 21 is either ground or sanded.

Having described my invention, I claim:

1. A light projector comprising a light, a pair of casings surrounding said light, said casings having apertures formed therein, each casing having its focus in the aperture of the other casing, and reflectors adapted to project the light from said foci.

2. A light projector comprising a light, a pair of casings surrounding said light, said casings having apertures formed therein, a light screen positioned in said apertures, each casing having its focus in the aperture of the other casing, and reflectors adapted to project the light from said foci.

In testimony whereof I affix my signature.

RUSSELL H. NEIL.